United States Patent [19]

Cravens et al.

[11] Patent Number: 4,880,250
[45] Date of Patent: Nov. 14, 1989

[54] ATTACHMENT KIT FOR MOBILE FLATBED FOR CARRYING TWO VEHICLES

[76] Inventors: Timothy J. Cravens; James A. Cravens, both of 8056 Bellhaven Ave., Pasadena, Md. 21122

[21] Appl. No.: 238,262

[22] Filed: Aug. 30, 1988

Related U.S. Application Data

[63] Continuation-in-part of Ser. No. 108,001, Oct. 14, 1987, abandoned.

[51] Int. Cl.⁴ .............................. B60P 3/08; B60P 3/10
[52] U.S. Cl. ...................................... 280/414.1; 410/3; 410/6; 410/9; 414/481
[58] Field of Search ...................... 280/414.1; 414/481, 414/429, 484, 537, 786, 471; 410/3, 6, 9, 26

[56] References Cited

U.S. PATENT DOCUMENTS

| | | | |
|---|---|---|---|
| 4,589,814 | 5/1986 | Cates | 280/414.1 |
| 4,705,289 | 11/1987 | Weber | 280/414.1 |
| 4,749,317 | 6/1988 | Daniel | 414/482 |

*Primary Examiner*—John A. Pekar
*Attorney, Agent, or Firm*—Leonard Bloom

[57] ABSTRACT

A kit is provided for attaching to a road travelling mobile platform (e.g. a wheeled trailer or a self-propelled vehicle such as a pickup truck or a flatbed truck) suitable for transporting a first vehicle. The kit enables the mobile platform to transport a second vehicle, such as a boat trailer carrying a boat, thereon. The kit includes: a tiltable ramp suitable for supporting a boat and boat trailer thereon; a first support for supporting one portion of the tiltable ramp in an elevated position with respect to the mobile platform; a chain and drum located on the first support for securing the boat and boat trailer to the tiltable ramp; and a second support capable of supporting a long lever arm portion of the tiltable ramp in an elevated position or capable of retaining the long lever arm portion in a lowered position. The first and second supports include connectors for connecting the mobile platform to the respective supports. The first support also includes a fulcrum serving to divide the tiltable ramp into a short lever arm portion and a long lever arm portion. The chain and drum and also adjustable wheel stops enable selective movement of the boat and boat trailer towards or away from the fulcrum to locate the center of gravity of the tiltable ramp and boat and boat trailer over the fulcrum. The second support for the tiltable ramp includes a lock for locking the ramp either in an elevated or lowered position with respect to the second tiltable ramp support.

35 Claims, 7 Drawing Sheets

ATTACHMENT KIT FOR MOBILE FLATBED FOR CARRYING TWO VEHICLES

CROSS-REFERENCE TO CO-PENDING APPLICATION

The present invention constitutes a continuation-in-part to our co-pending application Ser. No. 108,001, filed Oct. 14, 1987 abandoned for "A Kit Adapting a Trailer to Carry a Manually Tipped Boat on a Boat Trailer and a Motor Vehicle," the disclosure of which is incorporated herein in its entirety.

FIELD OF THE INVENTION

The present invention relates to the field of mobile flatbeds for carrying a vehicle. More particularly, the invention relates to trailers pulled by a first vehicle for carrying a second vehicle. Still more particularly, the invention relates to a trailer capable of carrying two vehicles. Most particularly, the present invention relates to a trailer capable of carrying a motor vehicle and a boat on a boat trailer.

BACKGROUND OF THE INVENTION

In the prior art, there are numerous examples of trailers capable of carrying two vehicles, especially when one of the two vehicles is a boat trailer carrying a boat. There is a lot of patent activity in the field which indicates that providing a practical trailer capable of carrying two vehicles is an important problem that needs a solution. Nevertheless, in spite of the patent activity, there is a scarcity of marketed trailers solving this problem. This is so because most of the patented trailers are overly complicated, unreliable, or too costly.

The prior art of which the applicants are aware that may be germane to the patent process are as follows:
U.S. Pat. No. 3,870,339 of Goff;
U.S. Pat. No. 3,909,057 of Guthry;
U.S. Pat. No. 3,970,203 of Watson, Jr.;
U.S. Pat. No. 4,068,772 of Prudhomme;
U.S. Pat. No. 4,188,056 of Watson;
U.S. Pat. No. 4,221,420 of Vencill et al;
U.S. Pat. No. 4,406,477 of McDonald;
U.S. Pat. No. 4,420,165 of Goodin;
U.S. Pat. No. 4,469,346 of Low;
U.S. Pat. No. 4,560,316 of Daniels;
U.S. Pat. No. 4,589,814 of Cates;
U.S. Pat. No. 4,705,289 of Weber;
French Patent No. 1,188,175; and
French Patent No. 1,297,191.

Generally, the prior art the prior art trailers for carrying two vehicles have undesirable features of one sort or another. More specifically, some such trailers are of such design that they must be specially fabricated for carrying two vehicles; there is no capability of retrofitting a conventional vehicle trailer. Some such trailers require immersion of the trailer in water in order to launch a boat. Many such trailers require expensive dedicated power and motion equipment for loading and unloading the carried vehicles, thus adding to inconvenience and adding excess weight that must be hauled.

Yet more specifically, it is often desired to employ a motor home or other recreational vehicle (RV) to tow a vehicle trailer that carries another vehicle, such as a small car or pickup, and a boat trailer carrying a boat. Once the relatively large and heavy RV is parked, the relatively small and lightweight vehicle carried on the trailer can then be used for transportation in the vicinity of the RV. It is much more convenient to use the small car or pickup for towing the boat trailer or for general transportation around the RV parking site than to use the large and weighty RV for such purposes. It would be desirable to provide easily operated manual means for loading and unloading a small car or pickup and a boat trailer carrying a boat from a trailer hauled by an RV.

SUMMARY OF THE INVENTION

Accordingly, it is a primary object of the present invention to provide a kit system that economically converts almost any mobile flatbed capable of carrying one vehicle into a modified mobile flatbed capable of carrying a second vehicle, especially a boat trailer carrying a boat.

Another object of the invention is to provide a kit system that disassembles into easily carried and shipped pieces.

Another object of the invention is to provide a road traveling trailer for carrying a boat trailer which is not immersed in water when the boat is launched.

Another object is to provide a road traveling trailer that does not require dedicated power equipment for loading and unloading a first and second vehicle that is carried.

Still another object of the invention is to provide a mobile flatbed that is capable of being manually operated for carrying two vehicles.

Yet another object of the invention is to provide a mobile flatbed that is capable of carrying a conventional car or pickup truck and a boat trailer carrying a boat.

In accordance with the principles of the invention, a kit is provided for attaching to a road traveling mobile platform (e.g. a wheeled trailer or a self-propelled vehicle such as a pickup truck or other flatbed truck suitable for transporting a first vehicle). The kit enables the mobile platform to transport a second vehicle, such as a boat trailer carrying a boat thereon, a second car, or one or more motorcycles. The kit includes: a tiltable ramp suitable for supporting the second vehicle thereon; first means for supporting the tiltable ramp wherein the first ramp supporting means supports one portion of the tiltable ramp in an elevated position with respect to the mobile platform; means for preventing the second vehicle, located on the tiltable ramp, from being dislocated from said tiltable ramp (e.g. means for securing the second vehicle to the first ramp support means); and second means for supporting the tiltable ramp, the second ramp support means supporting the long lever arm portion of the tiltable ramp in an elevated position. The first support means includes means for connecting the mobile platform thereto and also includes a fulcrum serving to divide the tiltable ramp into a short lever arm portion and the long lever arm portion. The securing means enables selective movement of the vehicle towards or away from the fulcrum. The second means for supporting the tiltable ramp includes means for locking the ramp with respect to the second supporting means either in an elevated or lowered position.

In employing the kit of the invention, the first vehicle being carried by the mobile platform may be an automobile or pickup. The second vehicle carried by the mobile platform may be a boat trailer holding a boat. The second vehicle could also be a second automobile.

In accordance with another aspect of the invention, a trailer apparatus is provided for transporting a first and second vehicle. The trailer apparatus includes, basically, a kit of the invention in combination with a road traveling trailer. More specifically, the trailer apparatus of the invention includes: a trailer platform which includes wheels, means for connecting the platform to a pulling vehicle, and a first ramp permitting movement of a first vehicle onto the apparatus, the platform for retaining a first vehicle directly thereon; a tiltable second ramp suitable for supporting a second vehicle at a position elevated above the trailer platform; first means, supported by the trailer platform, for supporting the tiltable second ramp, the first ramp supporting means supporting the tiltable second ramp in an elevated position with respect to the trailer platform, the first support means including a fulcrum serving to divide the tiltable second ramp into a short lever arm portion and a long lever arm portion; means for securing the second vehicle, located on the tiltable ramp, to the first ramp support means; and second means, supported by the trailer platform, for supporting the tiltable ramp, the second ramp support means capable of supporting the long lever arm portion of the tiltable ramp in an elevated position and capable of retaining the long lever arm in a lowered position.

The long lever arm portion of the tiltable second ramp is capable of being lowered so that the end of the long lever arm portion is in a position near the first ramp, and the short lever arm portion remains in an elevated position, whereby a second vehicle can be pushed up the tiltable ramp from the first ramp.

Preferably, the means for securing the second vehicle to the first ramp support means are connected to the second vehicle in a position located above the long lever arm portion and are connected to the first ramp support means at a position below the short lever arm portion. The means for connecting the second vehicle to the first ramp supporting means may be comprised of a length of flexible material such as a cable or chain and a ratcheted drum for tightening the cable or chain.

Furthermore, the means for connecting the means for securing the second vehicle to the first ramp support means enable selective movement of the second vehicle towards or away from the fulcrum.

Preferably, the weight of the second vehicle is distributed over the short lever arm, the fulcrum, and the long lever arm, such that a person is capable of manually lifting the second vehicle around the fulcrum by applying a lifting force near the end of the long lever arm position. In this respect, means are provided for adjusting the center of gravity of the tiltable ramp and the second vehicle near the fulcrum. Thereby, an ordinary person is capable of manually lifting the second vehicle around the fulcrum by applying a lifting force near the end of the long lever arm position.

In addition, means for locking the tiltable ramp with respect to the second tiltable ramp support means are provided.

In accordance with yet another aspect of the invention, a kit is provided for attaching to the enclosed flat floor or flat bed of a van or other enclosed-body vehicle to enable the vehicle to transport or to store other vehicles therein and to serve as a storage room or living quarters when the vehicles are removed.

These and other objects and advantages of the present invention will become apparent from a reading of the following specification, taken in conjunction with the drawings.

BRIEF DESCRIPTION OF THE DRAWINGS

FIGS. 2-9 are side views of the steps in using a kit of the invention installed on a road traveling trailer connected to an RV.

DESCRIPTION OF THE PREFERRED EMBODIMENT

Figure 1:
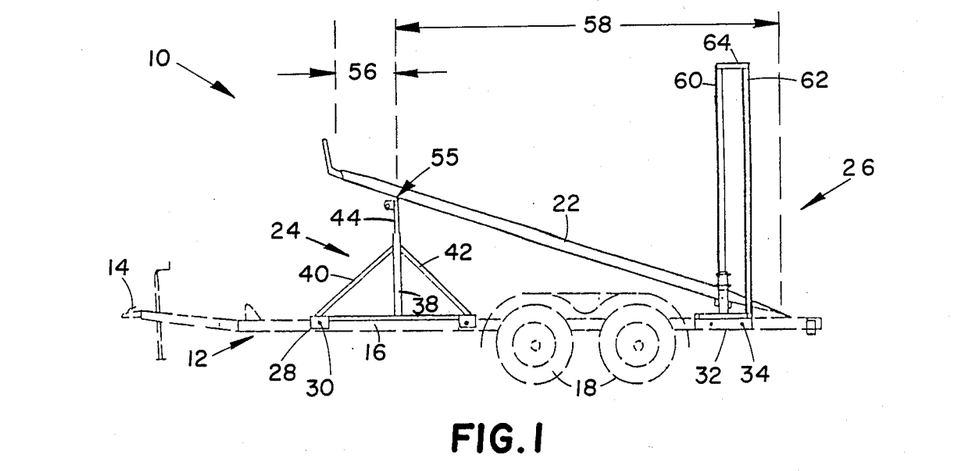
FIG. 1 is a side view of a kit of the invention installed on a road traveling trailer.

With references to FIG. 1, a kit 10 of the invention is installed on a highway trailer 12. The highway trailer 12 includes a trailer hitch 14, a flatbed portion 16, wheels 18, and retractable ramps 20. The kit 10 of the invention includes a pair of tiltable ramps 22, a pair of first supports 24 for the ramps 22, and a pair of second supports 26 for the ramps 22.

The first supports 24 are connected to the trailer bed portion 16 by brackets 28 and bolts 30. The second supports 26 are connected to the bed 16 by brackets 32 and bolts 34.

The first supports 24 include horizontal bars 36 (See FIGS. 12 and 13) which support upright tubes 38. The brackets 28 are connected to and support braces 40 and 42 which are also connected to upright tubes 38. Adjustable sliding support bars 44 are located partially inside upright tubes 38. Tubes 38 are provided with a vertical row of holes. Adjustable support bars 44 are also provided with a vertical row of holes which can be placed in registration with the holes in upright tubes 38. The sliding support bars 44 can be adjusted with respect to the upright tubes 38, and one or more pins can be inserted into the holes in upright tubes 38 and support bars 44 which are in registration to fix the adjusted arrangement.

Figure 11:
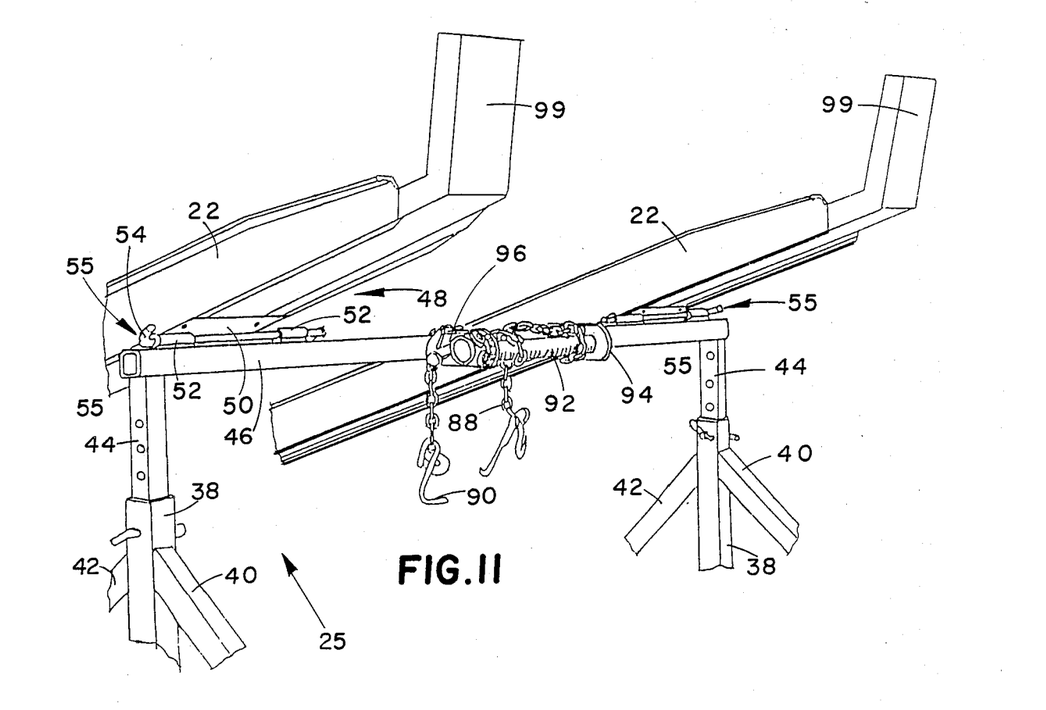
FIG. 11 is a close up view of the top portion of the first tiltable ramp support showing the interrelationship between the tiltable ramp and the first support.

As shown in FIG. 11, a cross-member 46 is connected between the pair of first supports 24 to complete a first support assembly 25 for the tiltable ramps 22. Each tiltable ramp 22 is connected to the cross-member 46 by a hinge assembly 48 which includes a hinge 50 attached to the tiltable ramp 22, two hinges 52 attached to the cross-member 46, and a hinge pin 54 connecting the hinges 50 and 52. The hinge pin 54 serves as a fulcrum 55 between the tiltable ramp 22 and the cross-member 46 of the first support assembly 25.

Further referring to FIG. 1, the fulcrum 55 divides the tiltable ramps 22 into a short lever arm portion 56 and a long lever arm portion 58. The short lever arm portion 56 extends toward the front of the trailer 12; and the long lever arm portion 58 extends toward the rear of the trailer 12.

The second supports 26 include a vertical slide post 60 and a vertical support post 62 connected at their respective bottoms by brackets 32 and connected at their respective tops by cross-members 64.

Figure 10:
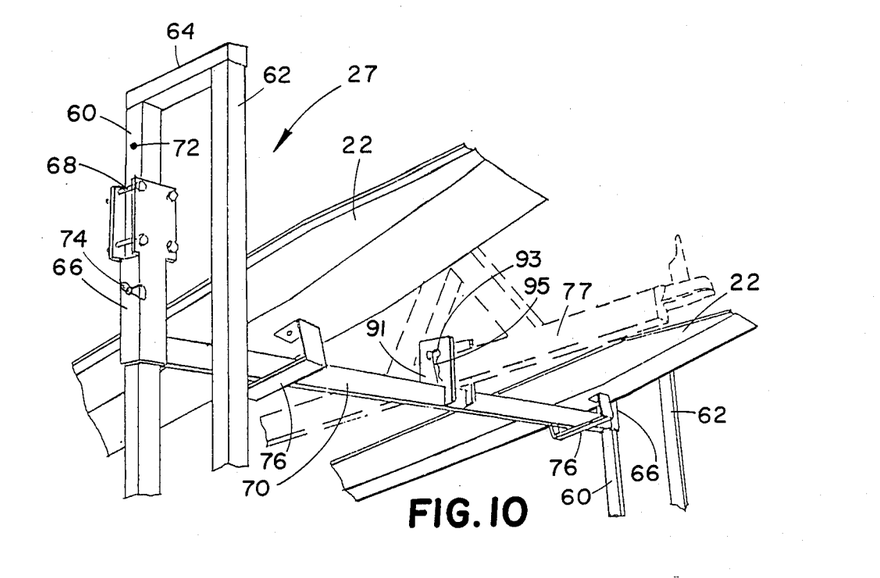
FIG. 10 is a close up view of the top portion of the second tiltable ramp support showing the interrelationship between the tiltable ramp and the second support.

As further shown in FIG. 10, a slide bracket 66 partially jackets the vertical slide post 60. To facilitate sliding of the slide bracket 66 and the vertical slide post 60, sleeve type rollers 68 are provided. A transverse member 70 extends between the two slide brackets 66 and serves to support the long lever arm ends of the tiltable ramps 22.

This slide bracket 66 provided with a hole 72 and a pin 74. The vertical slide post 60 is provided with at least one elevated hole that is placed in registration with the hole 72 in the slide bracket 66. When pin 74 is placed through the hole in the slide bracket 66 and the elevated hole in the vertical slide post 60, then the tiltable ramps 22 are locked in an elevated position.

Taken together, the second supports 26 and the transverse member 70 serve as a second support assembly 27 for the tiltable ramps 22.

The bottom sides of tiltable ramps 22 are equipped with U-shaped brackets 76 which connect the tiltable ramps 22 to the transverse member 70.

FIGS. 2-9 illustrate the sequential steps in using the kit 10 of the invention installed on a trailer 12.

Figure 2:
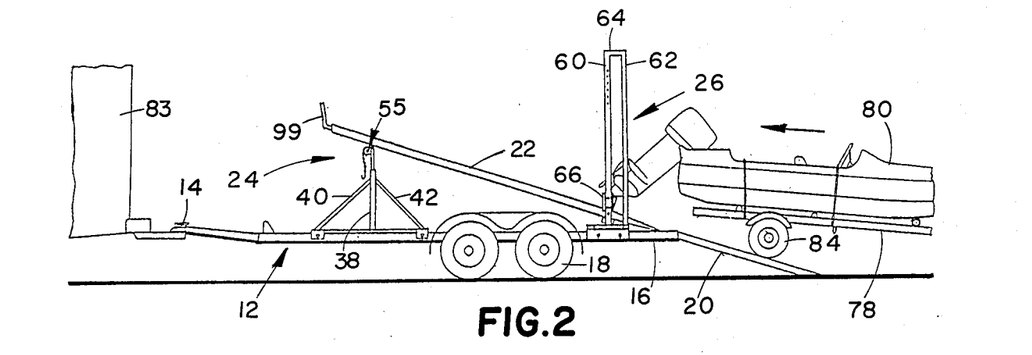
FIG. 2 shows a boat trailer carrying a boat being pushed up the first ramp by a small car.

In FIG. 2, the retractable ramps 20 have been lowered from the trailer 12, and a boat trailer 78 carrying a boat 80 is being backed up on the retractable ramps 20. A car 82 (shown in FIG. 3) is used to move the boat trailer 78 up the retractable ramps 20. The trailer 12 is attached to a recreational vehicle (RV) 83.

Figure 3:
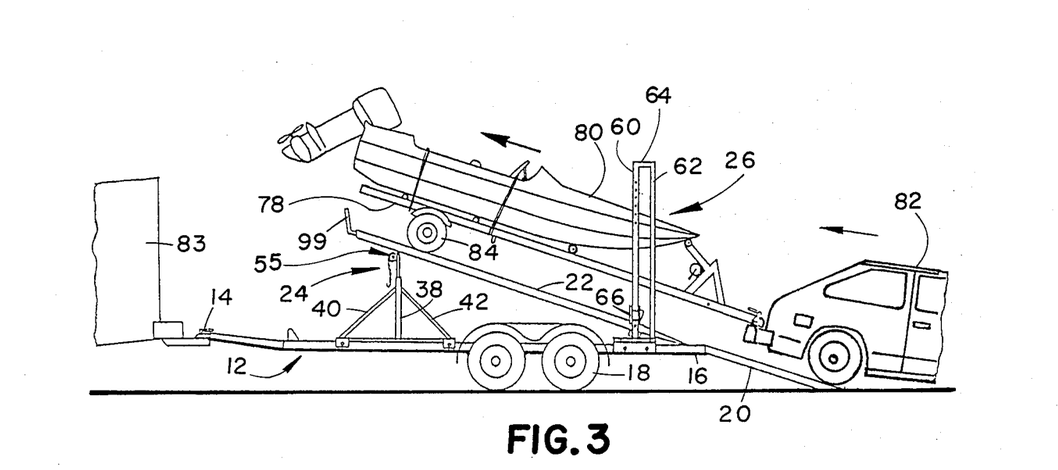
FIG. 3 shows the boat trailer being pushed up the tiltable ramp by the a small car.

In FIG. 3, the boat trailer 78 has been moved up the tiltable ramps 22 to a point where the wheels 84 of the boat trailer 78 are on the long lever arm portions of the tiltable ramps 22. The long lever arm portions of tiltable ramps 22 have been lowered so that the ends of long lever arm portions are in a position near the retractable ramps 20.

Figure 4:
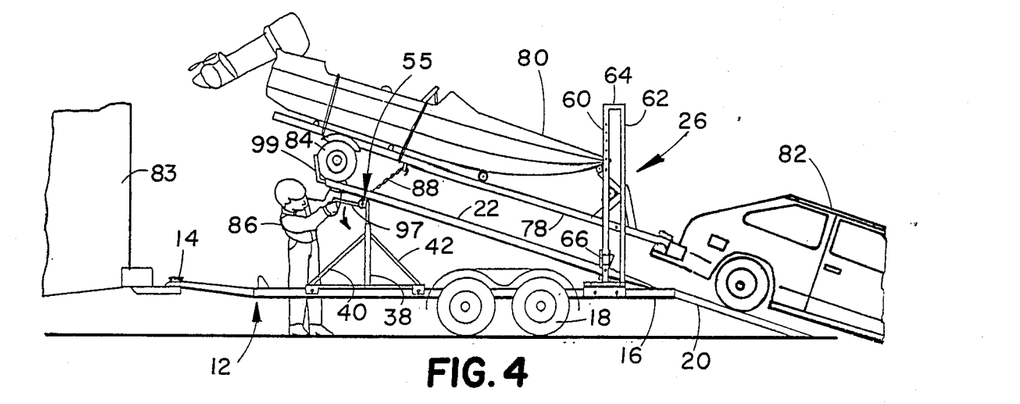
FIG. 4 shows the boat trailer being secured to the first support for the tiltable ramp.

In FIG. 4, the boat trailer 78 has been moved completely up the tiltable ramps 22. The wheels 84 of the boat trailer 78 have passed over the fulcrum 55 and now rest on the short lever arms of the tiltable ramps 22.

As shown in FIG. 4, and as further shown in FIG. 11, the operator 86 has connected the first support assembly 25 to the boat trailer 78 by chains 88. More specifically, chains 88 have hooked ends 90 which can hook into receiving portions of the boat trailer 78. The chains 88 are connected to a drum 92 supported by brackets 94. Furthermore, the drum 92 is equipped with a ratchet assembly 96 that permits the chains 88 to retain desired tautness until the ratchet assembly 96 is released.

The chains 88 can be tightened by a drum lever 97. The drum 97, ratchet assembly 96, drum lever 92, chains 88, and hooked ends 90 are of conventional, commercially available design.

As shown in the drawing figures, the drum 92 for the chains 88 is fixed to the first support assembly 25 toward the front side of the fulcrum 55; and the chains 88 are attached to the boat trailer 78 on the rear side of the fulcrum 55. By this arrangement, tightened the chains 88 results in the boat trailer 78 being pulled toward the front side of the fulcrum 55, and loosening the chains results in the boat trailer 78 being moved, by gravity, toward the rear side of the fulcrum 55.

Generally, it is desirable that a boat and boat trailer combination be balanced on the wheels of the trailer. This means that the center of gravity of the boat and boat trailer combination is essentially located over the tires of the boat trailer.

More specifically with reference to FIG. 4, the weight of the boat 80 and boat trailer 78 combination is essentially located over the wheels 84 of the boat trailer 78, which is very near the end of the short lever arm, toward the front of the fulcrum 55.

For optimum operation of the invention, it is desirable that the center of gravity of the aggregate weight of the entire combination of boat 80, boat trailer 78, tiltable ramps 22, U-shaped brackets 76, slide brackets 66, and transverse member 70 be located very near the fulcrum 55. With this in mind, the tension on the chains 88 can be adjusted to shift the boat 80 and boat trailer 78 combination to "fine tune" the location of the center of gravity of the aggregate weight of the entire combination to be very near the fulcrum 55.

Although the aggregate weight of the entire combination is very heavy, when the center of gravity of the aggregate weight of the entire combination is very near the fulcrum 55, the amount of human force needed to raise and lower the tiltable ramps 22 is relatively very low, that is the force required to overcome the friction at the fulcrum 55 and the friction of the slide brackets 66 against the vertical slide posts 60.

Figure 5:
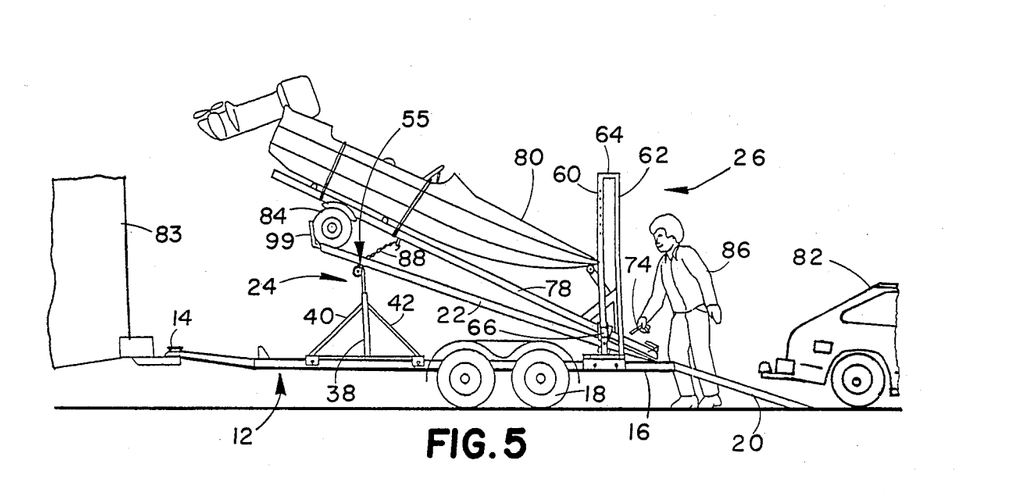
FIG. 5 shows the tiltable ramp being unlocked from the second ramp support to enable the adjacent end of the tiltable ramp to be manually lifted after the small car has been detached from the boat trailer.

As shown in FIG. 5, the boat trailer 78 has been disconnected from the car 82. The operator 86 has removed pin 74 which was placed through the hole 72 in the slide bracket 66 and a low level hold in the vertical slide post 60 which locked the tiltable ramps 22 in the low level position for loading the boat trailer 78.

Figure 6:
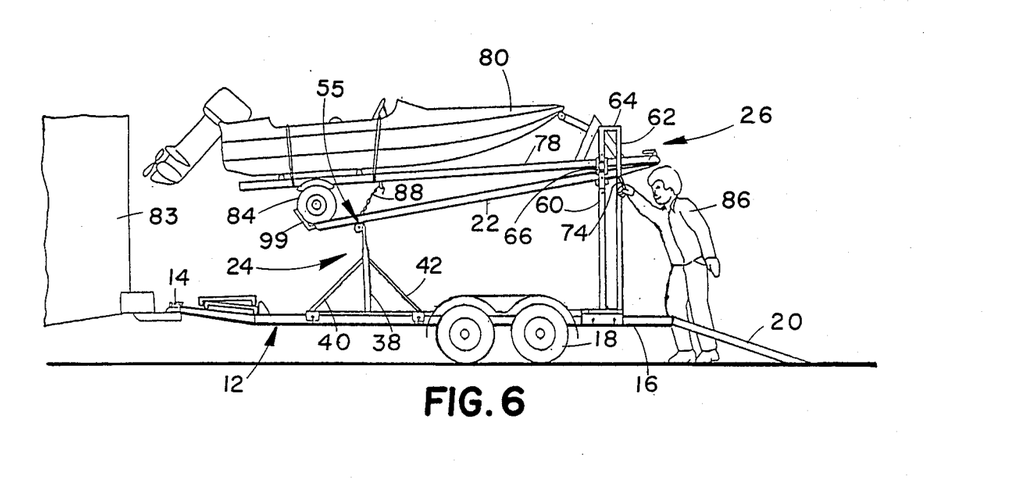
FIG. 6 shows a man raising an adjacent end of the tiltable trailer and locking the tiltable ramp in the elevated position.

In FIG. 6, the operator 86 has raised the end of the tiltable ramps 22 to the elevated position by exerting human force upwardly at the end of the long lever arm 58. The operator 86 would then insert pin 74 through hole 72 in the slide bracket 66 to register with an elevated hole in the vertical slide post 60 to lock the tiltable ramps 22 in the elevated position. Also see FIG. 10.

Figure 7:
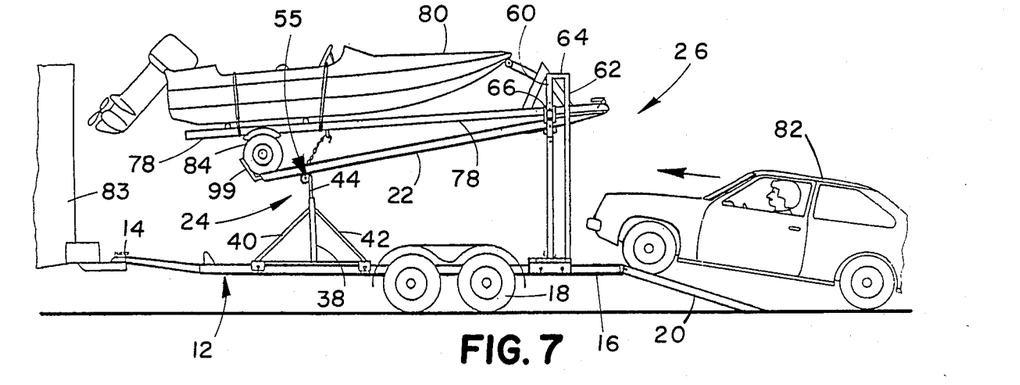
FIG. 7 shows a small car being driven onto the road traveling trailer.

In FIG. 7, the car 82 is being driven onto the trailer 12.

Figure 8:
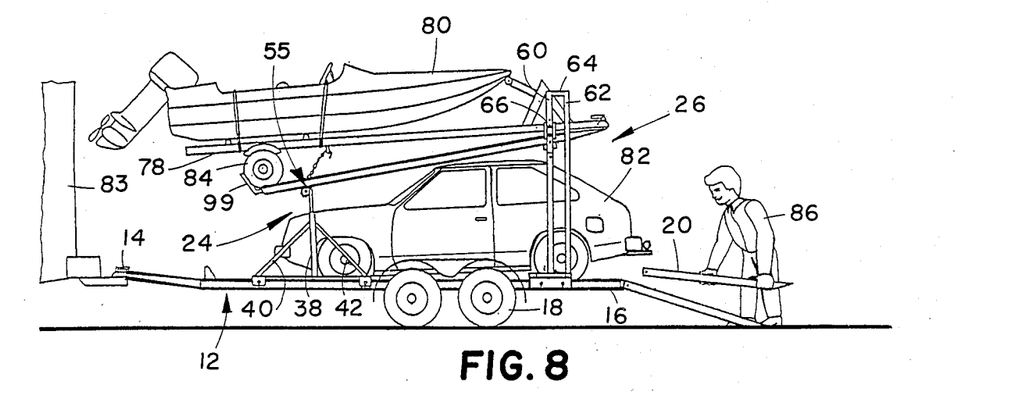
FIG. 8 shows the small car in position of the road traveling trailer and the man loading the first ramps back onto the trailer.

In FIG. 8, the car 82 has been driven onto the trailer 12 and is supported by the flat bed portion 16. The boat and boat trailer combination 80, 78 are supported by the tiltable ramps 22, first support assembly 25, and second support assembly 27 which are supported by the trailer 12.

In FIG. 8, the operator 86 is about to place a retractable ramp 20 into a hollow receiving member in the flatbed portion 16 of the trailer 12.

Figure 9:
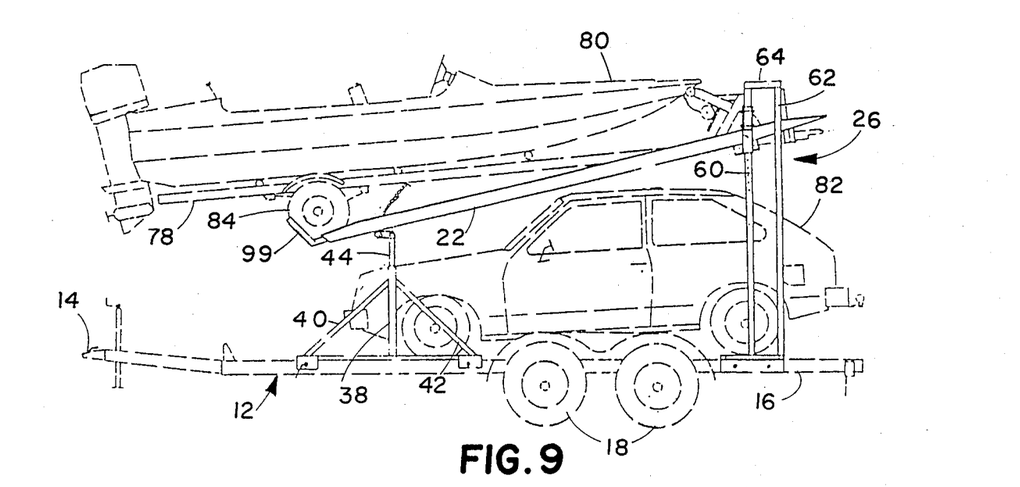
FIG. 9 shows the trailer apparatus of the invention ready to be pulled by the RV to transport both the boat trailer carrying the boat and the small car.

In FIG. 9, the trailer 12 containing the boat 80, boat trailer 78, and car 82 is ready to be pulled by the RV.

Further with reference to FIG. 10, the tongue portion 77 of the boat trailer 78 is fixed to the transverse member 70 by means of safety lock bracket 91, pin 93, and safety clip 95. The safety lock bracket 91 is welded transverse member 70. Pin 93 is passed through holes in the safety lock bracket 91 and retains the trailer tongue 77 in the bracket 91.

Further with reference to FIG. 11, the tiltable ramps 22 include adjustable wheel stops 99. The wheel stops 99 can be moved farther away from the fulcrum 55 or closer to the fulcrum 55 and then locked in position to "fine tune" the location of the center of gravity of the aggregate weight of the entire combination of elements that weigh upon the fulcrum 55.

Figure 12:
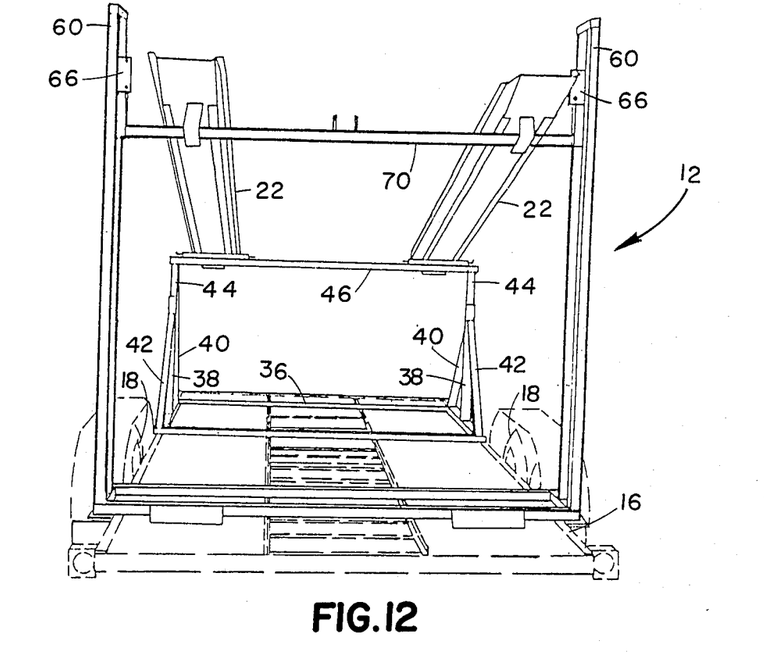
FIG. 12 is a view looking from the rear (the loading end) toward the front (the pulling end) of the trailer of the invention.

FIG. 12 shows an empty trailer 12 and the tiltable ramps 22 in the elevated position. Elements not in the kit of the invention are shown in broken lines. Elements in the kit of the invention are shown in solid lines.

Figure 13:
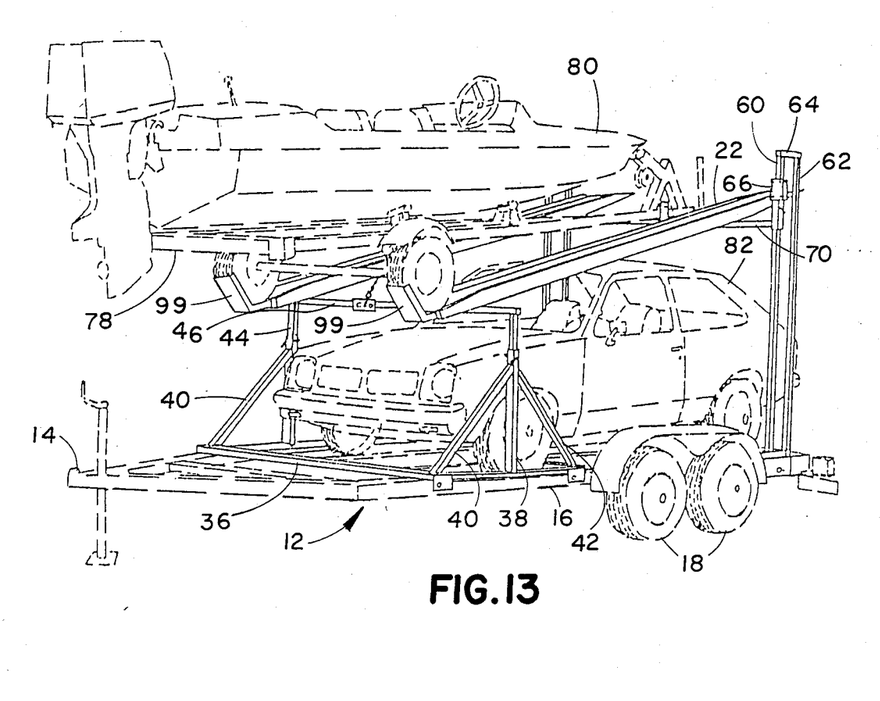
FIG. 13 is a perspective view of a trailer of the invention detached from the RV and retaining a small car and a boat trailer with boat thereon.

FIG. 13 shows a trailer 12 loaded with a boat 80, boat trailer 78, and car 82. Elements in the kit of the invention are shown in solid lines. Elements not in the kit of the invention are shown in broken lines.

Figure 14:
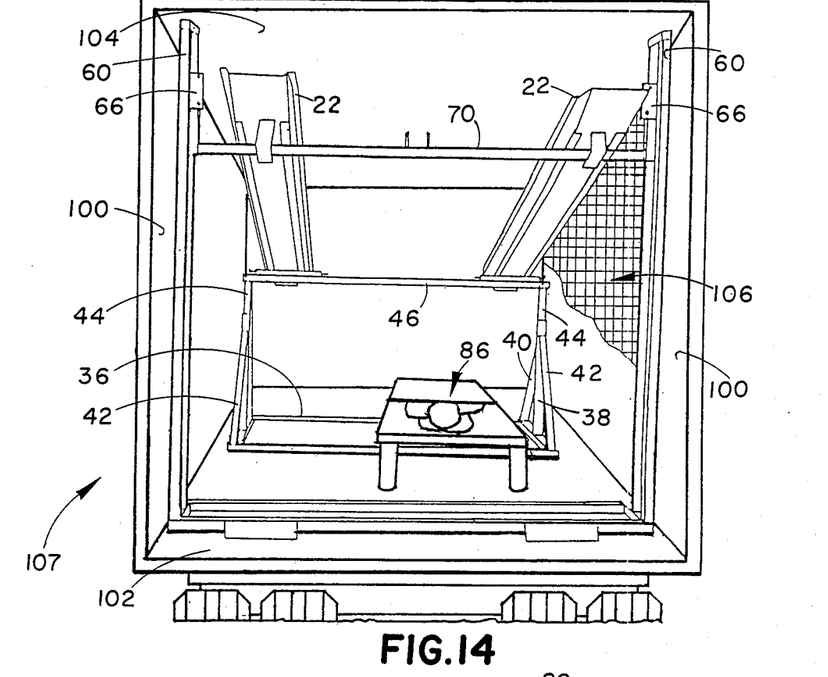
FIG. 14 is an embodiment of the invention wherein a storage room or living quarters are provided.

In FIG. 14 an embodiment of the invention is shown wherein the enclosed area of a self-propelled van 107 has walls 100, a floor 102, and a ceiling 104 to provide a storage area or living quarters below the tiltable ramps 22 (of the kit 10) which have been raised to the ceiling 104 by raising the adjustable support bars 44 and slide brackets 66 to be near the ceiling 104. An operator 86 is sleeping on a bed, and a mosquito netting 106 is provided to keep out flying insects.

Figure 15:
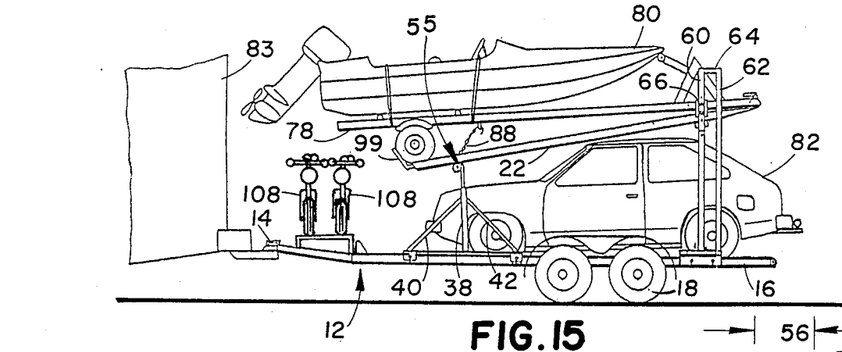
FIG. 15 is an embodiment of a kit of the invention used for carrying motorcycles.

Referring to FIG. 15, one or more motorcycles 108 (or one or more bicycles) can be carried on the front portion of the highway trailer 12 oriented perpendicularly to a car 82 and boat trailer 78 which are also carried on the highway trailer 12 at the same time.

Figure 16:
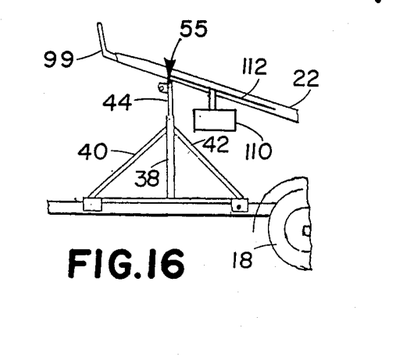
FIG. 16 is an embodiment of a kit of the invention which employs sliding weights for adjusting the center of gravity of the second vehicle and the tiltable ramp with respect to the fulcrum.

In FIG. 16, sliding weights 110 are used for "fine tuning" the location of the center of gravity of the aggregate weight over the fulcrum 55. The sliding weights 110 may be affixed with means for sliding in slots 112 located at the sides of one or more of the tiltable ramps 22.

Figure 17:
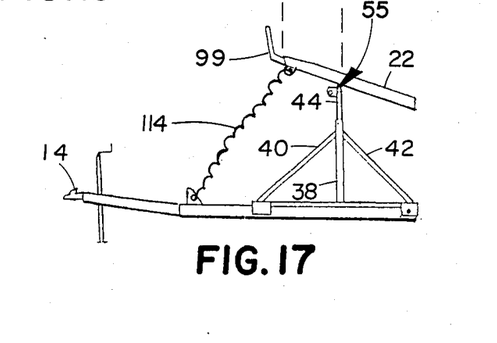
FIG. 17 is an embodiment of a kit of the invention which employs springs for adjusting the center of gravity of the second vehicle and the tiltable ramp with respect to the fulcuum.

In FIG. 17, adjustable springs 114 are fixed to the short lever arm portions 56 of the tiltable ramps 22. By adjusting the tension in the springs 114, the center of the aggregate of forces can be "fine tuned" to be located directly over the fulcrum 55.

Figure 18:
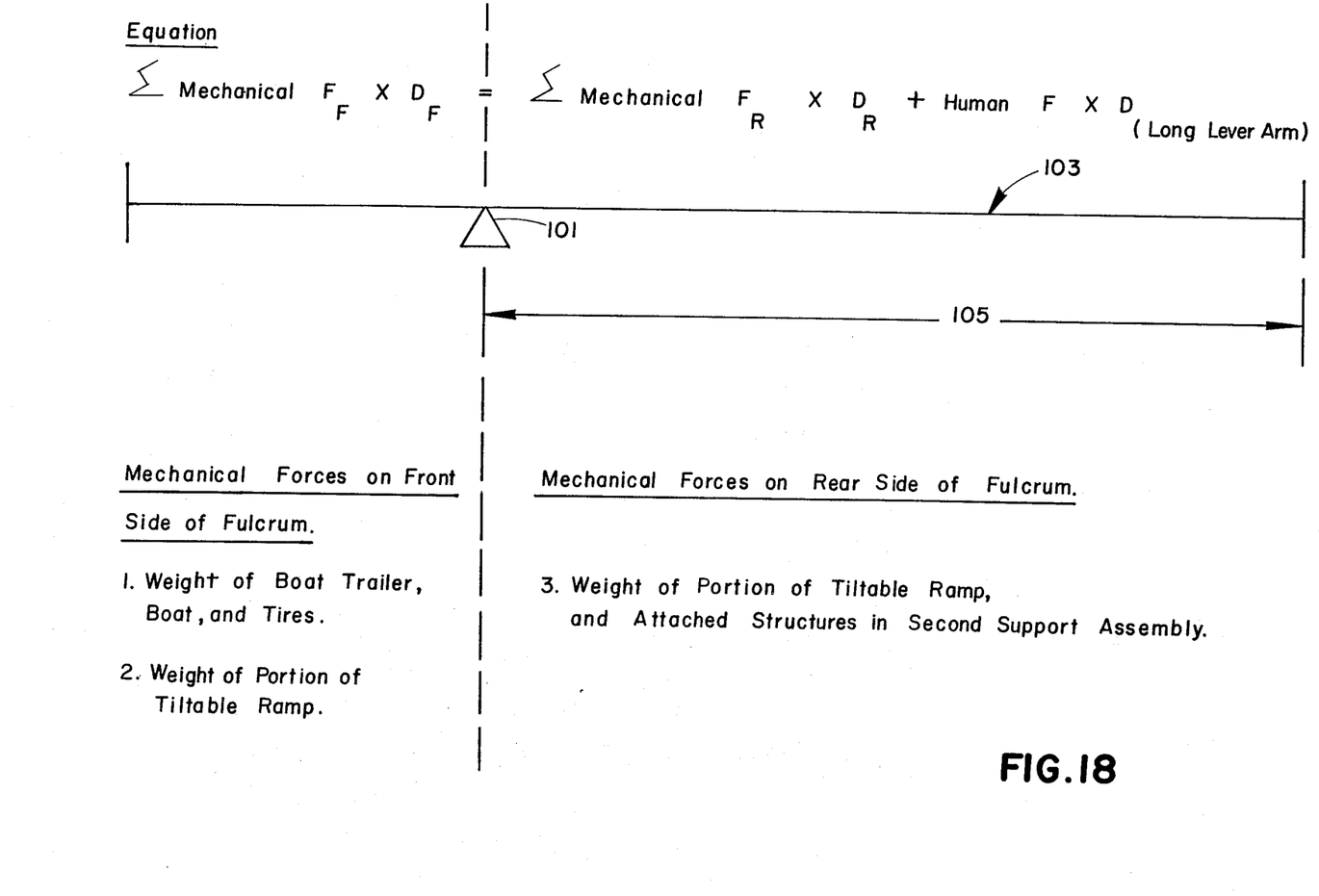
FIG. 18 shows an equation relating to the forces involved in balancing the boat and trailer and tiltable ramp over the fulcrum.

In FIG. 18, a schematic diagram is prsented to clarify the positioning of forces at play in balancing the boat, trailer, and tiltable ramp of the embodiment in FIG. 1. The fulcrum 101 has a long lever 103 placed thereon. The law of physics that must be obeyed is depicted in the formula wherein: the sum of the products of each mechanical force on the front side of the fulcrum times its respective distance from the fulcrum is equal to the sum of the products of each mechanical force on the rear side of the fulcrum times its respective distance from the fulcrum plus the product of the human force of the operator times the length of the long lever arm 105.

In the tabular listing in FIG. 18, mechanical forces on the front side of the fulcrum include:

1. weight of boat, boat trailer, and tires; and
2. weight of portion of tiltable ramp.

The result of mechanical forces on the front side of the fulcrum include:

a. the product of the weight of boat and trailer and tires times the distance of the center of gravity to the fulcrum;

b. the product of the weight of the portion of the tiltable ramp on the front side of the fulcrum times the distance from the fulcrum;

c. the frictional force at the fulcrum when balance is in favor of the rear side of the fulcrum; 10 In the tabular listing in FIG. 18, mechanical force on the rear side of the fulcrum include:

3. weight of portion of tiltable ramp and attached structures in second support assembly.

The result of mechanical forces on the rear side of the fulcrum include:

d. the product of the weight of the portion of the tiltable ramp on the rear side of the fulcrum times the distance from the fulcrum;

e. the frictional force at the fulcrum when balance is in favor of the front side of the fulcrum;

Another factor on the rear side of the fulcrum is the product of the human force of the operator times the long lever arm.

By nearly equating the sum of mechanical force-distance products on the front side of the fulcrum with the sum of mechanical force-distance products on the rear side of the fulcrum, the human force required to raise and lower the tiltable ramp/boat/boat trailer is nearly equal to the frictional force at the fulcrum which is relatively low.

In carrying out the principles of the invention, means are employed to nearly equate the mechanical forces on the front side of the fulcrum with the mechanical forces on the rear side of the fulcrum. More specifically, if the sum of the products of forces in paragraphs a. and b. above is less than the sum of the products of forces in paragraph d. above, then some kind of product of force-distance would be added to the front side of the fulcrum. For example, one way to add to the sum of force-product to the front side of the fulcrum is to add weight to the front side. Another way to add to the sum of force-product to the front side is to add a force-exerting spring to the front side. Yet another way to add to the sum of force-product to the front side is to shift some of the weight on the front side to be further away from the fulcrum, e.g. moving the wheel stops further away from the fulcrum or pulling the boat trailer tightly against the wheel stops to further compress the tires of the boat trailer and essentially shift the weight of the boat trailer and boat thereon to a position farther distant from the fulcrum.

Still another way to correct a lesser value for the front side sum of force-distance products is to subtract some weight from the rear side. Alternatively, some weight on the rear side could be shifted to be closer to the fulcrum to thereby lessen the sum of force-distance products.

Furthermore, within a range of ordinary human capability, the amount of human force needed at the end of the long lever arm on the rear side of the fulcrum can be increased to overcome an excess of the sum of force-distance product on the front side of the fulcrum.

A number of significant advantages are obtained by employing the invention. It is readily seen that the components of the kit system of the invention are easily disassembled from a trailer into easily carried and shipped pieces. Furthermore, by using the invention, the boat trailer, not the road traveling trailer would be immersed in water when the boat is launched. With the invention, no special power equipment is needed on a highway trailer for loading and unloading a boat trailer onto it; only manual operation is needed.

Obviously, many modifications may be made without departing from the basic spirit of the present invention. For example, a strong metal, such as a high quality steel, can be used for fabricating the major components of the kit of the invention. Conventional welding techniques can be used to fabricate the kit. Accordingly, it will be appreciated by those skilled in the art that within the scope of the appended claims, the invention may be practiced other than has been specifically described herein.

What is claimed is:

1. A kit for attaching to a moblie flatbed suitable for transporting a first vehicle, said kit enabling the mobile flatbed to transport a second vehicle thereon, said kit comprising:
    a tiltable ramp suitable for supporting the second vehicle thereon,
    first means, for supporting said tiltable ramp, said first ramp supporting means supporting one portion of said tiltable ramp in an elevated position with respect to the mobile flatbed, said first support means including means for connecting the mobile flatbed thereto, said first support means including a fulcrum serving to divide said tiltable ramp into a short lever arm portion and a long lever arm portion,
    means for preventing the second vehicle, located on said tiltable ramp from being dislocated from said tiltable ramp,
    second means for supporting said tiltable ramp, said second ramp support means supporting the long lever a portion of said tiltalbe ramp in an elevated poisition, and
    means for adjusting the center of gravity of the second vehicle and said tiltable ramp with respect to said fulcrum whereby said tiltable ramp is readily tilted manually.

2. The kit described in claim 1, wherein said means for adjusting the center of gravity of the second vehicle and said tiltable ramp include wheel stops connected to said tiltable ramp.

3. The kit described in claim 1 wherein the mobile flatbed is a wheeled trailer pulled by a motor vehicle.

4. The kit described in claim 1 wherein the mobile flatbed is the bed of a self-propelled vehicle.

5. The kit described in claim 1 wherein the first vehicle is an automobile.

6. The kit described in claim 1 wherein the second vehicle is a boat trailer holding a boat.

7. The kit described in claim 1 wherein said second means for supporting said tiltable ramp includes means for locking said tiltable ramp with respect to said second supporting means.

8. A kit for attaching to a mobile flatbed suitable for transporting a first vehicle, sid kit enabling the mobile flatbed to transport a second vehicle thereon, said kit comprising:
    a tiltable ramp suitable for supporting the second vehicle thereon,
    first means,for supporting said tiltable ramp, said first ramp supporting means supporting one portion of said tiltable ramp in an elevated position with respect to the mobile flatbed, said first support means including means for connecting the mobile flatbed thereto, said first support means including a fulcrum serving to divide said tiltable ramp into a short lever arm portion and a long lever arm portion,
    means for prevneting the second vehicle, located on said tiltable ramp from being dislocated from said tiltable ramp,
    second means for supporting said tiltable ramp, said second ramp support means supporting the long lever arm portion of said tiltable ramp in an elevated position, and
    wherein said means for preventing the second vehicle form being dislocated from said tiltable ramp are comprised of means for securing the second vehicle to said front ramp support means.

9. The kit described in claim 8 wherein said securing eans enables selective movement of the second vehicle towards or away from the fulcrum.

10. An apparatus for transporting a first and second vehicle, said apparatus comprising:
    a mobile platform capable of retaining a first vehicle directly thereon,
    a first ramp permitting movement of the first vehicle onto said mobile platform,
    a tiltable second ramp suitable for supporting a second vehicle at a position elevated above said mobile platform.
    first means, supported by said mobile platform, for supporting said tiltable second ramp, aid first ramp supporting means supporting said tiltable second ramp in an elevated position with respect to said mobile platform, said first support means including a fulcrum serving to divide said tiltable second ramp into a short lever arm portion and a long lever arm portion,
    means for securing the second vehicle, located on aid tiltable ramp, to said first ramp support means,
    second means, supported by said mobile platform, for supporting said tiltable ramp, said second ramp support means capable of supporting the long lever arm portion of said tiltable ramp in an elevated position and capable of retaining the long lever arm portion in a lowered position.

11. The transporting apparatus described in claim 10 wherein the mobile flatbed is a wheeled trailer pulled by a motor vehicle.

12. The transporting apparatus described in claim 10 wherein the mobile flatbed is the bed of a self-propelled vehicle.

13. The transporting apparatus described in claim 10 wherein said means for securing the second vehicle to said first ramp support means are connected to the second vehicle in a position located above said long lever arm portion and are connected to said first ramp support means at a position below said short lever arm portion.

14. The transporting apparatus described in claim 10 wherein said means for securing the second vehicle to said first ramp supporting means is comprised of a length of flexible material and means for tightening said flexible material.

15. The transporting apparatus described in claim 10 wherein said means for securing the second vehicle to said first ramp support means enable adjustment of the center of gravity of the second vehicle and said tiltable ramp towards or away from the fulcrum.

16. The transporting apparatus described in claim 10 further including means for adjusting the center of gravity of the second vehicle and said tiltable ramp with respect to said fulcrum.

17. The transporting apparatus described in claim 16 wherein said means for adjusting the center of gravity of the second vehicle and said tiltable ramp include springs.

18. The transporting apparatus described in claim 10 wherein said means for adjusting the center of gravity of the second vehicle and said tiltable ramp include sliding weights.

19. The transporting apparatus described in claim 10 wherein the weight of the second vehicle is distributed over said short lever arm, said fulcrum, and said long lever arm, such that a person is capable of manually lifting the second vehicle around said fulcrum by applying a lifting force near the end of said long lever arm portion.

20. The transporting apparatus described in claim 10 wherein the center of gravity of the second vehicle is positioned near said fulcrum.

21. The transporting apparatus described in claim 10 whereby a person is capable of manually lifting the second vehicle around said fulcrum by applying a lifting force near the end of ,said long lever arm position.

22. The transporting apparatus described in claim 10, further comprising means for locking said tiltable ramp with respect to said second tiltable ramp support means.

23. An apparatus for transporting a first and second vehicle, said apparatus comprising:
   a mobile platform capable of supporting a first vehicle thereon,
   a tiltable ramp suitable for supporting a second vehicle at a position elevated above said trailer platform,
   a first means, supported by said mobile platform, for supporting said tiltable ramp, said first ramp supporting means supporting said tiltable ramp in an elevated position with respect to the mobile platform, said first support means including a fulcrum, and
   means for supporting the center of gravity of the combined weight of the second vehicle and said tiltable ramp near and above said fulcrum.

24. A kit for attaching to a mobile flatbed suitable for transporting a first vehicle, said kit enabling the mobile flatbed to transport a second vehicle thereon, said kit comprising:
   a tiltable ramp suitable for supporting the second vehicle thereon;
   first means for supporting said tiltable ramp in an elevated position with respect to the mobile flatbed, said first support means including a fulcrum serving to divide said tiltable ramp into a short lever arm portion and a long lever arm portion, the center of gravity of both said tiltable ramp and the second vehicle being located near said fulcrum,
   second means for supporting said long lever arm of said tiltable ramp in an elevated position.

25. The kit described in claim 24 wherein the mobile flatbed is a wheeled trailer pulled by a motor vehicle.

26. The kit described in claim 24 wherein the mobile flatbed is the bed of a self-propelled vehicle.

27. The kit described in claim 24, further including means for securing the second vehicle to said first ramp support means.

28. The kit described in claim 24, further including means for adjusting the amount of manual force applied to said long lever arm for raising the long lever arm to an elevated position.

29. A trailer apparatus for transporting a first and second vehicle, said apparatus comprising:
   a trailer platform including wheels, means for connecting said platform to a pulling vehicle, and a first ramp permitting movement of a first vehicle onto said apparatus, said platform for retaining a first vehicle directly thereon,
   a tiltable second ramp suitable for supporting a second vehicle at a position elevated above said trailer platform,
   first means, supported by said trailer platform, for supporting said tiltable second ramp, said first ramp supporting means supporting said tiltable second ramp in an elevated position with respect to the trailer platform, said first support means including a fulcrum serving to divide said tiltable second ramp into a short lever arm portion and a long lever arm portion,
   means for securing the second vehicle, located onsaid tiltable ramp, to said first ramp support means,
   second means, supported by said trailer platform, for supporting said tiltable ramp, said second ramp support means capable of supporting the long lever arm position of said tiltable ramp in an elevated position and capable of retaining the long, lever arm portion in a lowered position.

30. The trailer apparatus described in claim 29 wherein said tiltable ramp is capable of being tilted so that one end of said tiltable ramp is lowered to a portion near said first ramp and the other end of said tiltable ramp remains n an elevated position, whereby a second vehicle can be pushed up said tiltable ramp from said first ramp.

31. A trailer apparatus for transporting a first and second vehicle, said apparatus comprising:
   a trailer platform including wheels, said trailer platform for supporting a first vehicle thereon,
   a tiltable ramp suitable for supporting a second vehicle t a position elevated above said trailer platform,
   first means, supported by said trailer platform, for supporting said tiltable ramp, said first ramp supporting means supporting said tiltable ramp in an elevated position with respect to the trailer platform, said first support means including a fulcrum, and
   means for supporting the center of gravity of the combined weight of the second vehicle and said tiltable ramp near and above said fulcrum.

32. A kit for attaching to a mobile flatbed, said kit enabling the mobile flatbed to serve as a storage room or living quarters and to transport a vehicle thereon, said kit comprising:
   a tiltable ramp suitable for supporting the vehicle thereon, first means for supporting said tiltable ramp, said first ramp supporting means supporting one portion of said tiltable ramp in an elevated position with respect to the mobile flatbed, said first support means including means for connecting the mobile flatbed thereto, said first support means including a fulcrum serving to divide said tiltable ramp into a short lever arm portion and a long lever arm portion, means for securing the vehicle, located on said tiltable ramp, to said first ramp support means, second means for supporting said tiltable ramp, said second ramp support means capable of supporting the long lever arm portion of said tiltable ramp in an elevated position and capable of retaining the long lever arm portion in a lowered position, walls supported by said mobile platform and extending vertically therefrom, said walls defining storage room or living quarters.

33. A method for carrying a vehicle on a mobile flatbed comprising the steps of:

providing a tiltable ramp supported on an elevated fulcrum on the mobile flatbed, lowering one end of the tiltable ramp to receive the vehicle, moving the vehicle onto the tiltable ramp so that the center of gravity of the vehicle and the tiltable ramp is nearly over the fulcrum, manually lifting the tiltable ramp without the use of mechanically operated manual lifting means to an elevated position, and retaining the tiltable ramp in the elevated position.

34. A kit for attaching to a mobile flatbed suitable for transporting a first vehicle, said kit enabling the mobile flatbed to transport a second vehicle thereon, said kit comprising:

a tiltable ramp suitable for supporting the second vehicle thereon, first means, for supporting said tiltable ramp, said first ramp supporting means supporting one portion of said tiltaable ramp in an elevated position with respect to the mobile flatbed, said first support means including means for connecting the mobile flatbed thereto, said first support means including a fulcrum serving to divide said tiltable ramp into a short lever arm portion and a long lever arm portion, means for preventing the second vehicle, located on said tiltable ramp from being dislocated form said tiltable ramp, second means for supporting said tiltable ramp, said second ramp support means supporting the long lever arm portion of said tiltable ramp in an elevated position, and means for adjusting the center of gravity of the second vehicle and said tiltable ramp with respect to said fulcrum, said adjusting means including cable means for attaching to the second vehicle at a location over said long lever arm portion and means, located on said first ramp supporting means, for tightening said cable means and pulling the second vehicle towards said short lever arm portion.

35. A kit for attaching to a mobile flatbed suitable for transporting a first vehicle, said kit enabling the mobile flatbed to transport a second vehicle thereon, said kit comprising:

a tiltable ramp suitable for supporting the second vehicle thereon, first means, for supporting said tiltable ramp, said first ramp supporting means supporting one portion of said tiltable ramp in an elevated position with respect to the mobile flatbed, said first support means including means for connecting the mobile flatbed thereto, said first support means including a fulcrum serving to divide said tiltable ramp into a short lever arm portion and a long lever arm portion, means for preventing the second vehicle, located on said tiltable ramp from being dislocated from said tiltable ramp, second means for supporting said tiltable ramp, said second ramp support means supporting the long lever arm portion of said tiltable ramp in an elevated position, and means for balancing the center of gravity of the second vehicle and said tiltable ramp with respect to said fulcrum.

* * * * *